(12) United States Patent
Wilkinson, Jr. et al.

(10) Patent No.: US 8,327,130 B2
(45) Date of Patent: Dec. 4, 2012

(54) UNIQUE IDENTIFICATION OF ENTITIES OF AN INDUSTRIAL CONTROL SYSTEM

(75) Inventors: John C. Wilkinson, Jr., Hudson, OH (US); Kenwood Henry Hall, Hudson, OH (US); Taryl Jon Jasper, South Euclid, OH (US); Michael Dean Kalan, Highland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 842 days.

(21) Appl. No.: 11/861,082

(22) Filed: Sep. 25, 2007

(65) Prior Publication Data

US 2009/0083843 A1 Mar. 26, 2009

(51) Int. Cl.
*H04L 29/06* (2006.01)
(52) U.S. Cl. ...................................................... 713/155
(58) Field of Classification Search .................. 726/9, 4, 726/27; 713/172, 186, 155, 156, 168
See application file for complete search history.

(56) References Cited

U.S. PATENT DOCUMENTS

| | | | | |
|---|---|---|---|---|
| 6,873,876 B1 * | 3/2005 | Aisa | | 700/86 |
| 7,013,184 B2 * | 3/2006 | Romagnoli et al. | | 700/17 |
| 7,278,026 B2 * | 10/2007 | McGowan | | 713/186 |
| 7,356,690 B2 * | 4/2008 | Benantar | | 713/155 |
| 2007/0168660 A1 * | 7/2007 | Little et al. | | 713/158 |

* cited by examiner

*Primary Examiner* — Beemnet Dada
(74) *Attorney, Agent, or Firm* — Turocy & Watson, LLP; R. Scott Speroff; John M. Miller

(57) ABSTRACT

Systems and methods are provided for issuing unique identification credentials to a plurality of devices, and their constituent components, in an industrial control system. Identification credentials are granted by an identification authority and conveyed to each of the credentialed devices and/or component through an identity token. The identification credentials include (1) a unique device identifier, (2) an identification authority component identifier, and (3) an indication of the location of the identification authority component. To secure the issued credentials, such credentials are encrypted and the identification token can be embedded with biometrics features. Identification credentials provide for the following prominent features: (i) Secure access to a device form a client and (ii) determination a topology of a set of credentialed devices in an industrial control system. The topology is network agnostic and facilitates organizational modeling of processes in the industrial control system.

14 Claims, 10 Drawing Sheets

UNIQUE IDENTIFICATION OF ENTITIES OF AN INDUSTRIAL CONTROL SYSTEM

TECHNICAL FIELD

The subject application relates generally to industrial control systems, and more particularly to issuing identification credentials to devices that operate in an industrial control system

BACKGROUND

Industrial control systems are ubiquitous across myriad industries and have been in operation since the mid twentieth century. Due to the design principles of maximum reliability and 100% availability, many industrial controllers have been in operation since their inception, with moderate changes to infrastructure—in part to avoid lengthy downtime periods associated with overhauling an industrial control system, which would be detrimental to availability. As a consequence, a sizeable portion of the infrastructure related to industrial controllers still in use today is legacy infrastructure, particularly in connection with devices employed in the controlled processes.

With the advent of modern networking technologies, and more affordable computational resources, a renovation of the control industry was expected. Yet, penetration of new technologies into industrial control systems based on legacy devices has turned out to be a slow process, even for those systems that incorporated digital processing technology in the late 1970s and early 1980s. Such slow progress is in part due to the quick obsolescence of relatively modern devices—e.g., devices employing computational resources and digital processing based on technology as recent as that developed in the mid 1990s are largely outperformed by computer technologies only a few years newer. It should also be appreciated that market pressures have also suppressed adoption of new technologies in the realm of automation system and industrial control, as such change of paradigm would result in significant downtime of factories, refineries, power plants, assembly lines, as well as a sizeable investment that could increase production costs and jeopardize positions of economical advantage—a clearly undesirable situation given the highly competitive economy of these days.

As a result, legacy industrial control systems, in particular devices employed in the various controlled processes, lack sufficient computational resources to adapt to new networking protocols and cyber-security aspects such as meaningful encryption. In essence, legacy devices that still offer a high standard of operational reliability fail to offer a level of security that is compatible with modern standards for networked systems. It should be appreciated that many of the security threats that networked system face today were non-existent as recently as the early 1990s.

In addition, security issues surrounding devices that operate within an industrial control system are not the only concerns related to legacy systems. New market aspects, such as globalization and inter-industry collaboration demand appreciable volumes of information that describe each active part of a factory or plant or production system. Such information has become a valuable tool for institutional planning and company development. Moreover, information related to a plant or factory or production line is necessary for better configuration management, better documentation of system architecture, and better contingency planning.

In view of the above, there is need for having a robust system for identification of devices in industrial systems that is compatible with legacy characteristics of devices, and yet affords security features in a networked environment, information mining, as well as contingency planning and organizational modeling.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

The subject innovation provides systems and methods for issuing unique identification credentials issued to a device in an industrial control system. Identification credentials are granted by an identification authority and conveyed to the credentialed device through an identity token. The identification credentials include (1) a unique device identifier, (2) an identification authority component identifier, and (3) an indication of the location of the identification authority component. Identification credentials can be encrypted at the time an identification authority issues said credentials. Additionally, identification token can be embedded with biometrics features to further protect the issued credentials. Such security feature can be implemented in devices that are deemed a critical asset to a process monitored by an industrial control system.

Identification credentials can also be issued by multiple identification authorities to devices in a single industrial control system. Moreover, disparate identification authorities can grant identification credentials to components within a single device. Such granularity can afford characterizing a device through identifiers based on specific functionalities of the credentialed device. Identification credentials for devices and components can then be employed to determine a topology of networked devices and components that have been identified by various identification authorities. Such topology can be characterized by a location agnostic network based on identification credentials and physical links among the credentialed devices. The topology characterization of networked devices in an industrial control system facilitates organizational modeling aimed at optimizing control processes, as well as controller load and performance.

Additionally, secure access to a device from a client can be accomplished by exploiting identification credentials of the device through multiple authentication steps. In an aspect, such steps include authentication of the legitimacy of a client that it intends to access a device. Successful authentication entails communication of valid identification credentials by the client, and affords the client access to operational credentials of the device that it intends to access. Such authentication mechanism, based on identification credentials issued to a device, mitigates breach of devices originating in spoof replicas of identification authorities associated with the breached devices.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other objects, advantages and novel features of the invention will become apparent from

DETAILED DESCRIPTION

Figure 1:
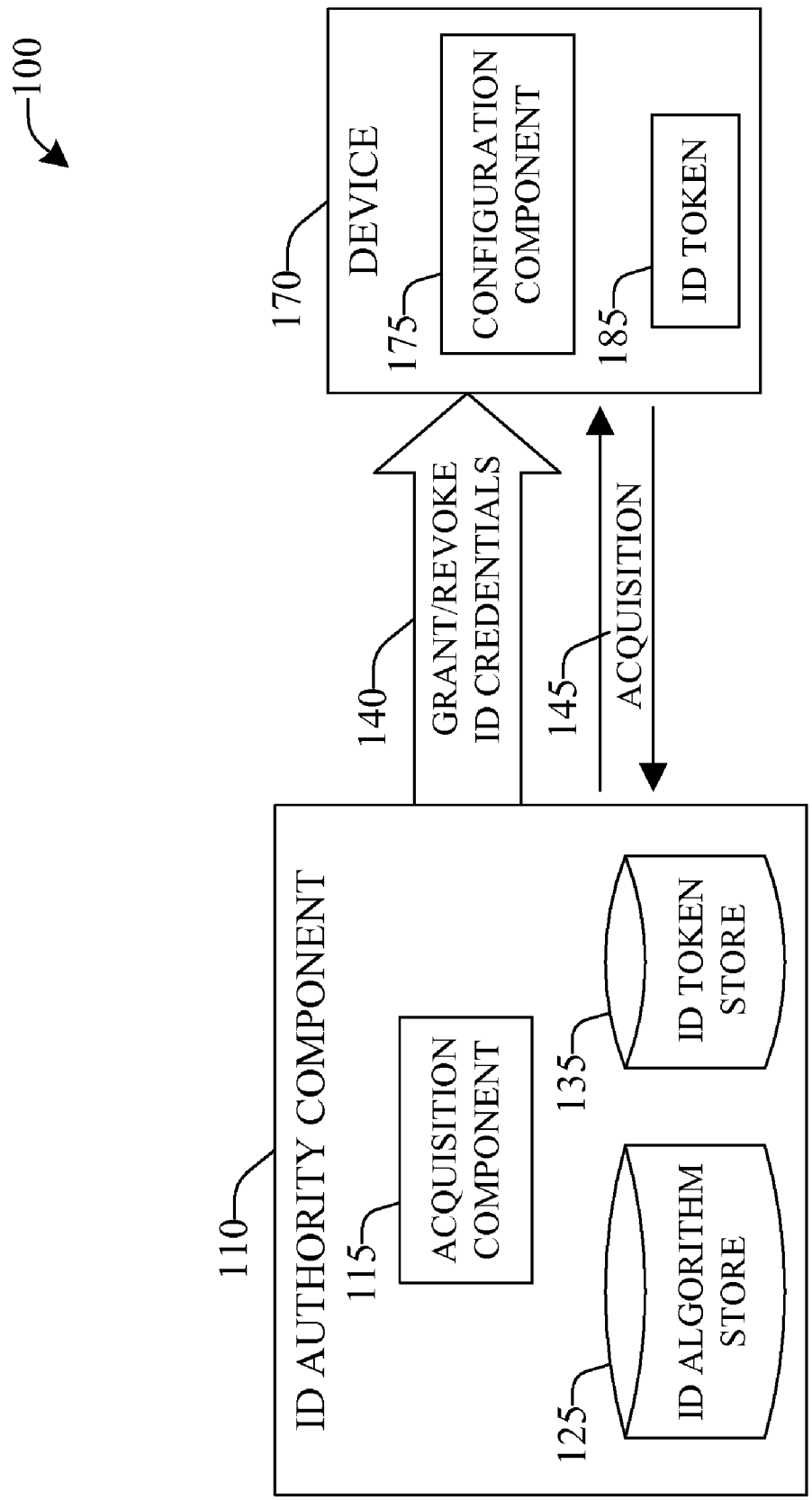
FIG. 1 illustrates a block diagram of a system that facilitates unique identification of a device in an industrial control system.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used in the subject specification, the term "identification authority" refers to an "identification authority component" and thereby both constructions are used interchangeably and should be equally interpreted according to the description herein. Similarly, the term "identification token" refers to an "identification token component" and are used interchangeably; equal meaning, as described in this specification, should be adopted for both constructions.

FIG. 1 illustrates a block diagram of a system 100 that facilitates unique identification of a device in an industrial control system. The identification relies on an identification (ID) component 110 that grants identification credentials, via a communication (forward) link 140 to a device 170 in the industrial control environment. To effect the identification, ID authority component 110 first acquires device 170 via an acquisition component 115. Device acquisition 135 can consist of characterizing operational and functional properties of the device. Namely, determining (i) the type of a device that is being acquired, such as a controller, a communications module, a human machine interface (HMI), an Input/Output module, a datalogger, a network router, a tank, a conveyor belt, a deposition chamber, a sensor, and so forth; (ii) reporting capabilities of the device, such as alarms, data transfer capabilities, embedded displays, etc.; (iii) role in a particular automated process, e.g., maintaining a target temperature or an electric/magnetic field, catalyzing a chemical reaction in a waste management plant, or opening/shutting gates in a canal; and (iv) establishing the "criticality" of the device in a processes and control thereof. It is noted that criticality of a device (e.g., device 170) depends primarily on process's nature rather than on the device itself. As an example, consider a thermostat: in maintaining the temperature of a freezing chamber in a food processing plant, the criticality of the thermostat is less accentuated than when the thermostat maintains the temperature of a processing chamber for biochemical weapons, wherein active biological agents might need to be maintained at a specific temperature to ensure lethality. In another example, a barometer that measures the gas pressure in a paint tank employed in a car assembly line can be deemed less critical than a barometer that measures the pressure in a vessel containing toxic, hazardous chemicals harmful to human life. In yet another example, a valve or gate opener/shutter can be critical such as in a vessel transfer canal (e.g., Panama Canal), or it can be markedly less critical such as in a city field irrigation system (e.g., sprinkler system in a city park).

The acquisition process typically is a start-up event that takes place when a device (e.g., device 170) is installed in an industrial automation system in order to perform specific functions controlled at least in part by the device's identification credentials. In an aspect, upon installation, a device can broadcast control information (e.g., a low-overhead k-bit control signal generated and transmitted by configuration component 175) indicating that it is ready for acquisition over the network onto which the industrial control system is deployed. Once such control information is detected by an identification authority component (e.g., ID authority component 110). In another aspect, when connecting to a device to a system entity in the system, agents such as a configuration tool (which can reside in a device's configuration component 175) can locate the proper identity authority component. In an alternative aspect, an ID authority component can periodically broadcast control information over the network so that newly installed devices can generate an acknowledgement message, to which the ID authority component can respond with an acquisition procedure.

Once an acquisition process 145 for a device 170 is finalized, ID authority component 110 issues the identification credentials based at least in part on acquired information (i)-(v) for said device, and an identification algorithm stored in ID algorithm store 125; assigns an identity token component 185 that contains the identification credentials and resides within the device 170; and stores the credentials in an ID token store 135. The issued identification credentials include (1) a unique device identifier, (2) an identification authority component identifier. Optionally, issued ID credentials can include an indication of the location of the identification authority component. It is noted that in a large scale control system proliferation of identifiers is feasible, to mitigate it the uniqueness of the identifiers can be restricted to the scope of the ID authority 110 issuing said identifiers.

It should be appreciated that while important for single-site industrial control systems (e.g., distributed control system (DCS)), indicating a location of the ID authority component—such as a location in a corporate network of the company that manages the control system, in a site of a manufacturer/vendor of the industrial control system, or a location in the control system network including a controller in a control system—it is particularly relevant to decentralized control systems (e.g., supervisory control and data acquisition system (SCADA)) with dispersed assets, such as water systems, electrical lines with substations geographically distributed. Stored identification credentials in the ID token component can be encrypted by an encryption component (not shown) to secure identification credentials integrity. In a facet of this aspect, the identification credentials in the assigned ID token component are transmitted encrypted over the forward link 140, to afford data integrity to legacy devices and to maintain a level of low complexity in contemporary devices.

Generally, an ID authority component (e.g., ID authority component 110) is involved with the identification credentials and not with direct processing of information generated by a device that the ID authority identifies. Nonetheless, complexity and computational resources of an ID authority component can parallel that of a typical computer desktop workstation, which far exceeds the computational capabilities of most devices in an industrial control system. Additionally, in an aspect, an ID authority can manage access to a device by a client (e.g., a software application, or an operator probe, etc.) through an authentication mechanism as discussed in greater details below.

ID authority component 110 can also revoke identification credentials or decommission a device. In such an instance, identification credentials associated with device 170 are removed from the ID token store 135, and the assigned ID token 185 that resides in device 170 can be reassigned to a null value or it can be logically invalidated and continue to reside in the device. In an aspect, logical invalidation can be accomplished by setting a flag bit to a selected value of either "0" or "1" to indicate the invalid status of the credentials. An advantage of logical invalidation is that the unique identifier assigned to a device can be reused in a recommissioning instance, without undergoing device acquisition 145. Additionally, ID token component can be removed from the device. To facilitate the latter, and a device decommissioning in general, an ID token component (e.g., ID token 185) can be a physical memory installed in the device (e.g., device 170), the memory is written upon commissioning as discussed above, and it can be flushed upon decommissioning.

It should be appreciated that decommissioning a device as described hereinbefore does not preclude the device from operating; however, it does preclude the device from accessing services that rely on identification credentials issued to the device, such as reporting (alarms, data, access log, etc.), content routing, and so on. In view of the potential lost functionality that a device can undergo upon decommissioning, a secure protocol, such as password authentication and the like, can be followed by ID authority component 110 when revoking identification credentials in a device.

Figure 2:
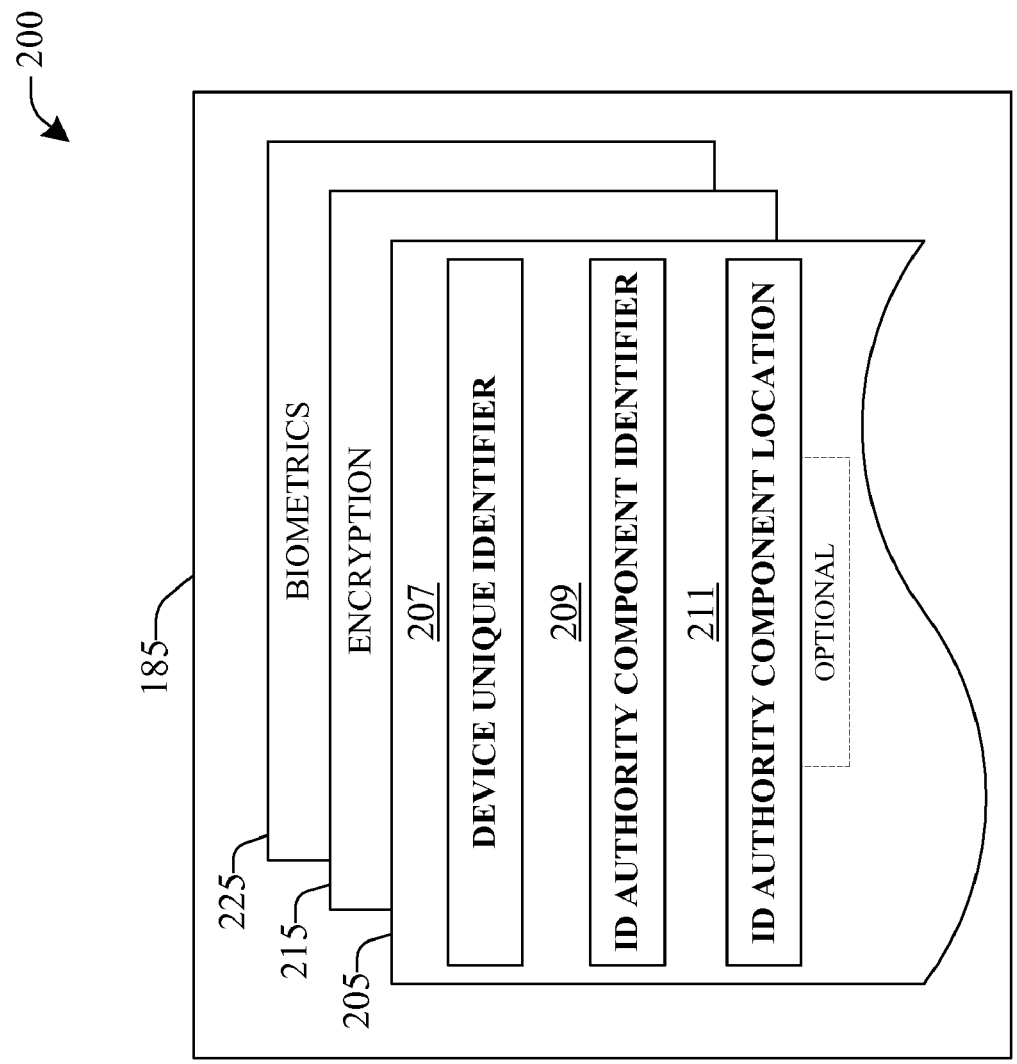
FIG. 2 presents an example diagram of an identity token component according to an aspect of the subject invention.

FIG. 2 presents an example diagram 200 of an identity token component 185. A document 205 contains a device's unique device identifier 207, an ID authority component identifier 209, and an optional indication of the ID authority component location 211. It is noted that while the information is presented in a document 205 in diagram 200, the credentials can be secured by two layers of security: encryption 215 and biometrics 225. Encryption 215 can be effected at the ID authority component (via an encryption component; not shown), and biometrics 225 can be commissioned at the location of the device that is being identified (e.g., device 170). It should be appreciated that biometrics features can be appropriate for critical devices and assets of an industrial control system. In addition, biometrics can be appropriate for SCADA systems, wherein field devices can benefit form a heightened security when accessed by a client (see below).

Figure 3:
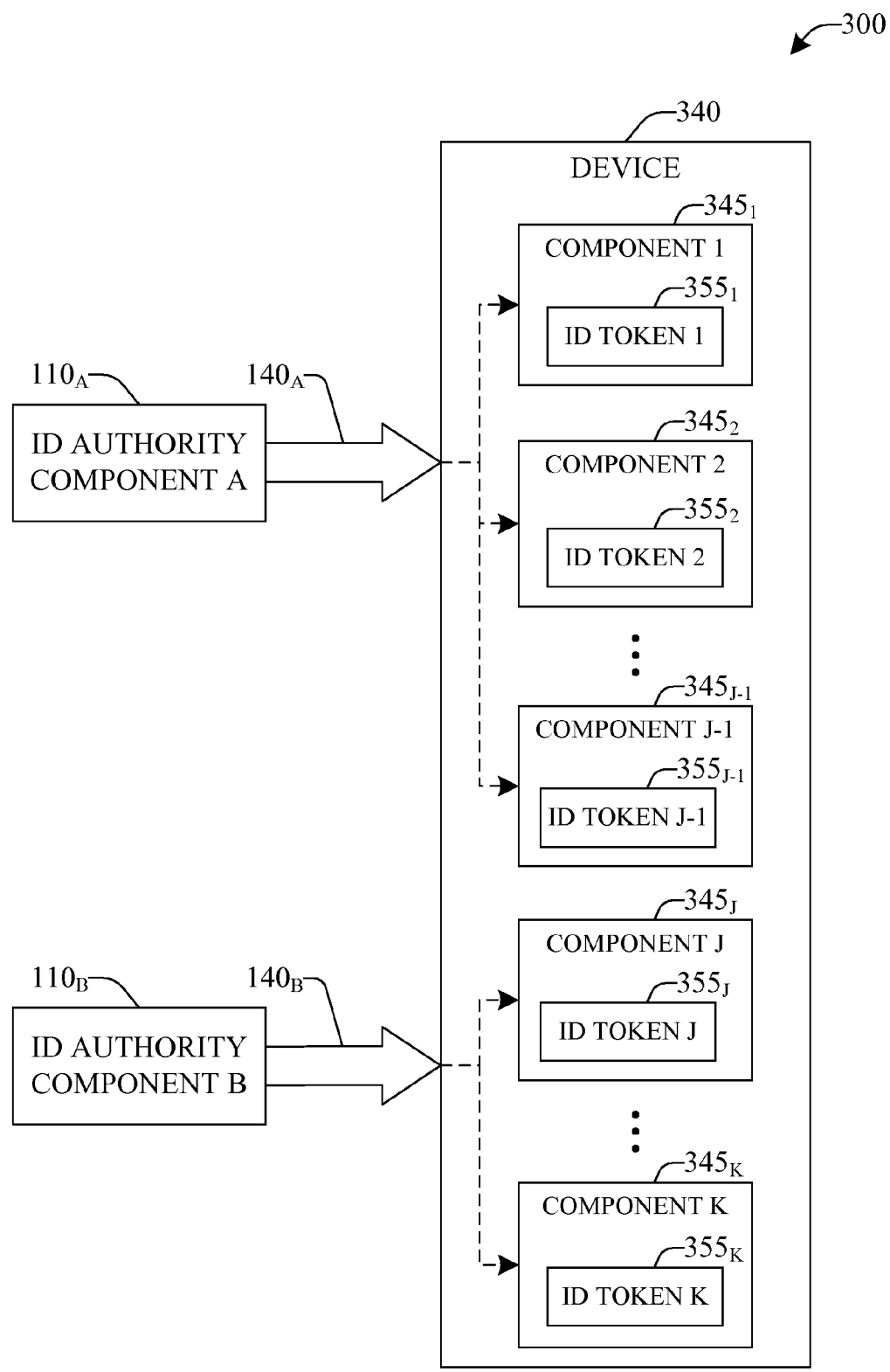
FIG. 3 illustrates an example embodiment in which more than one ID authority components issue identification credentials for multiple components of a single device in accordance with an aspect of the subject innovation.

Referring now to FIG. 3, it illustrates an example embodiment 300 in which two ID authority components 110$_A$ and 110$_B$ issue identification credentials for components of a single device 340. ID authority component A 110$_A$ issues credentials for device components 345$_1$-345$_{J-1}$, assigning ID tokens 355$_1$-355$_{J-1}$, and ID authority component B 110$_B$ issues credentials for device components 345$_J$-345$_K$, assigning ID token components 355$_J$-355$_K$. In an aspect, device components that a customer can customize to specific needs of the customer's industrial control system can be associated with a first ID authority component, and device components, or entities, which a customer should not modify, can be associated with a second ID authority. Generally, such ID authority components 110$_A$ and 110$_B$ can be related to different aspects of device 340. As an example, with K=2, ID authority component A 110$_A$ can be located in a car assembly plant, where device component A 345$_1$ is a robotic arm for car chassis painting. On the other hand, ID authority component B 110$_B$ can be located in a corporate headquarter of the enterprise that has control over the car factory, and as such it can be dedicated to managing access to devices in the factory for data collecting purposes—device component B 345$_2$ can be a reporting component of device 340 that can supply diagnostic data to headquarters. Issued credentials for the components of device 340 then can reflect such functionalities of the device conferred by device components 345$_1$ and device components 345$_2$. It should be appreciated that the granularity of device 340, e.g., the number (K) of device components, can be dictated by the criticality of the device—device in critical steps of a control process can have primary and secondary alarms, contingency loops that preserve the conditions of the device in case primary components fail, etc.

In the case device 340 is a logical entity, or component, such as a specific application executing in a controller in an industrial control system, device components 345$_1$-345$_K$ can be code objects and modules that provide the particular functionalities of such application. In an aspect, an ID authority component can issue ID credentials to code objects, e.g. classes, compiled or source code, that belong to the specific application, whereas a disparate ID authority component can grant identification credentials to modules employed by the specific application.

Figure 4:
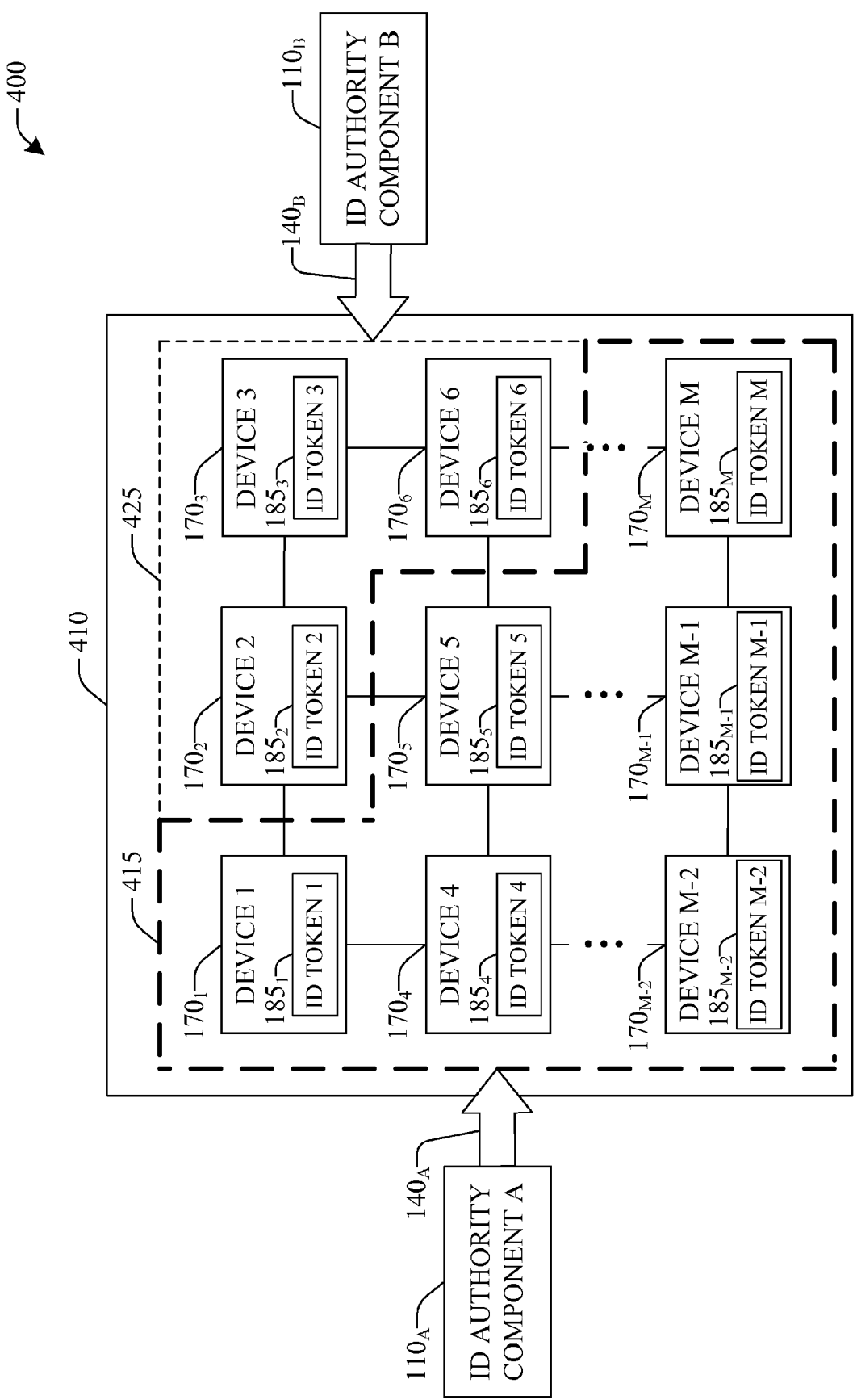
FIG. 4 illustrates an example embodiment in which multiple ID authority components grant/revoke identification credentials to a plurality of networked devices in an industrial control system.

FIG. 4 illustrates an example embodiment 400 in which multiple ID authority components grant/revoke identification credentials to a plurality of networked devices 170$_1$-170$_M$ in an industrial control system 410. Embodiment 400 displays an aspect of granularity (FIG. 3) at a higher level when compared to that discussed in reference to FIG. 3. In embodiment 400 identification aspects of a sub-system 415 of control system 410, e.g., devices {$170_1$, $170_4$, $170_5$, and $170_7$-$170_M$}, with M a natural number, are dictated by ID authority component A $110_A$ which establishes ID credentials through forward link $140_A$; and devices $170_2$, $170_3$, and $170_6$, encompassing sub-system 425 are identified by ID authority component B $110_B$ through forward link $140_B$. As in the case of fine device-level granularity (FIG. 3), the association of specific devices to specific ID authority components can be dictated by device capability, or operability (e.g., the role of the device in industrial control system).

Typically, such partitioning, or granularity, of control system 410 can be oriented towards optimizing control aspects, or production characteristics, or reporting features of control system 410: (a) In an aspect, in embodiment 400, devices $170_2$, $170_3$, and $170_6$ can correspond to sensors (e.g., a weight scale, a chronometer, and a barometer) that measure performance of one or more devices in subsystem 415. Such measurements can be employed for diagnostics in a control platform where ID authority component B $110_B$ resides. (b) In another aspect, $170_2$, $170_3$, and $170_6$ can be undergoing downtime for repairs/upgrades and ID authority component B $110_B$ can reside in a vendor's network organization enlisted to perform the maintenance. (c) In yet another aspect, devices in subsystem 425 can be employed to monitor specific output of subsystem 415, e.g., number of bottles of a beverage packaged per minute. Such information can then be used by the system where ID authority component B $110_B$ resides to conduct performance assessment of system 415 or organizational modeling of system 415 aimed at modifying/evaluating a specific control process.

It should be appreciated that forward links $140_A$ and $140_B$ can be embodied in substantially the same network, or disparate networks (as an example, FL $140_A$ can be a twisted-pair network, and FL $140_B$ is a fiber optic network or a wireless network). It should further be appreciated that other levels of granularity for control system 410 are possible, involving multiple ID authorization components. Such alternative scenarios are within the scope of the subjection innovation.

Figure 5:
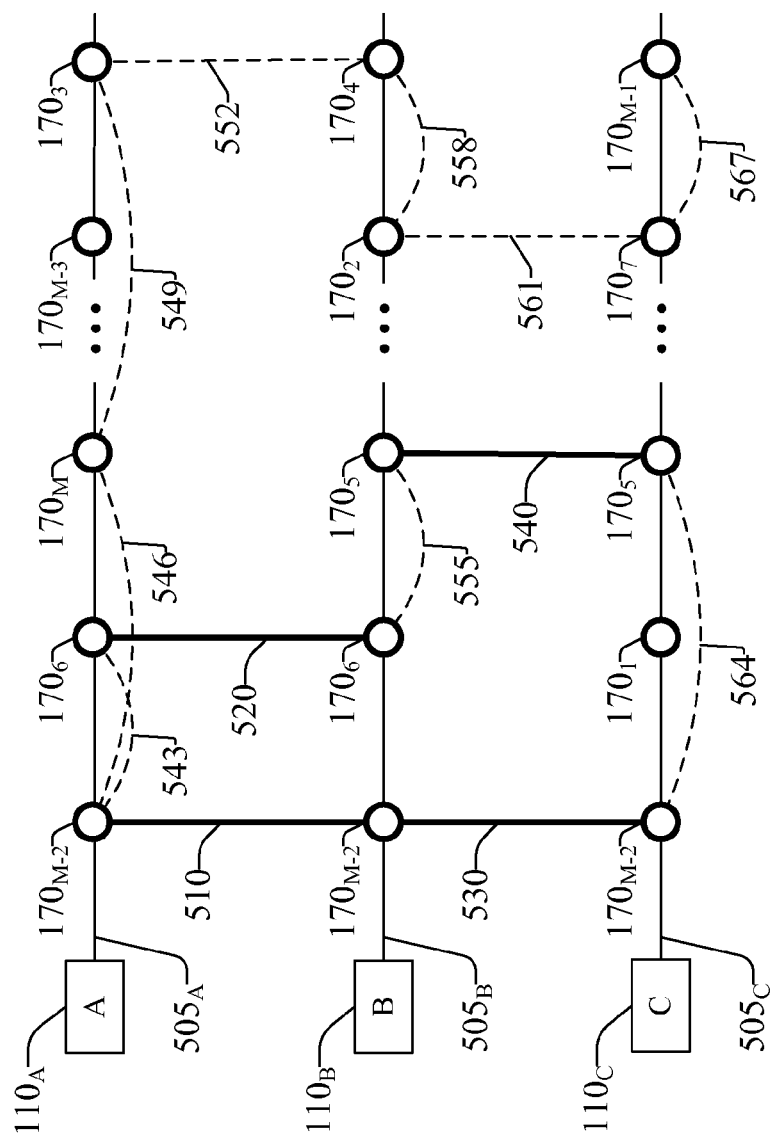
FIG. 5 is an illustration of a diagram representing the topology of a networked set of devices in an industrial control system according to an aspect of the present innovation.

FIG. 5 is an illustration of a diagram 500 representing the topology of a networked set of devices $170_1$-$170_M$ in an industrial control system according to an aspect of the present innovation. The representation is based on ID authority components and identification credentials issued by those authorities to devices $170_1$-$170_M$. Diagram 500 displays ID authorities A $110_A$, B $110_B$ and C $110_C$; however, any number of ID authorities engaged in identification of devices $170_1$-$170_M$ can be represented. The representation is based on an ID-authority-device scheme, wherein devices identified/credentialed by a common ID authority component (e.g., $110_A$, $110_B$, or $110_C$) are represented by nodes (e.g., $170_1$, $170_2$, . . . , $170_M$) in a layer (e.g., $505_A$, $505_B$, and $505_C$) associated with the corresponding credentialing ID authority. As discussed above in connection with FIG. 4, components within a device can be credentialed by disparate ID authorities, in a topology representation as the one described herein such devices are represented (replicated) in multiple layers. As an example, diagram 500 displays device $170_{M-2}$ in layers $505_A$, $505_B$ and $505_C$, indicating the all three ID authority ($110_A$, $110_B$, and $110_C$) have identified at least one component in said device. In topology representation 500, nodes corresponding to devices with components identified by disparate ID authorities, of which $170_6$ and $170_5$ are examples of, are linked with shared component links such as 510, 520, 530, and 540. Connectivity of layers through shared component links indicates the level of granularity of the credentialing mechanism.

In the ID-authority-device scheme 500 (FIG. 5), physical links among devices $170_1$-$170_M$ are represented by process links (e.g., 543, 546, 549, 552, 555, 558, 561, 564, and 567). The characteristics and nodes that such links couple are dictated by the process that the industrial automation control system controls—e.g., car assembly line, beverage packaging, integrated circuit imprinting, water irrigation, food processing, nuclear power generation, . . . . In FIG. 5, in layer $505_A$, device $170_{M-2}$ is linked through process link 543 to device $170_6$, and through process link 546 to device $170_M$. Similarly, link 549 connects devices $170_M$ and $170_3$. All these process links are intra-layer links as such devices are credentialed by ID authority component A $110_A$. Note, however, inter-layer process links are also present in the topology 500, such as link 552. In layer $505_B$, intra-layer process links 555 and 558 connect, respectively, the following pairs of devices: $170_6$-$170_5$, and $170_2$-$170_4$. Interlayer link 561 connects layers $505_B$ and $505_C$, through devices $170_2$-$170_7$. Devices $170_{M-2}$ and $170_5$ are connected via link 564, and devices $170_7$ and $170_{M-1}$ are linked by 567. Each of these links represent an actual action in a process (hence the name), such as transferring a mixture of syrup and water from a mixing tank (which can correspond to device $170_6$) to a fluid dispenser that coats cupcakes with the mixture (e.g., device $170_7$). Additionally, the links can represent a network bus connection (e.g., controller area network (CAN), and factory instrumentation protocol (WorldFIP)) that routes data packets from one node to another.

It should be appreciated that in this credential based topology (e.g., layers and nodes are determined according to the identification mechanism disclosed herein) is location agnostic. As such, reflecting changes in a process controlled by an industrial control system is effected by reorganizing links, without reorganizing nodes; the actual position of a node in a layer is arbitrary. It should further be appreciated that in case a device changes its ID authority component, as a consequence of a device upgrade or a plant upgrade, for example, the corresponding node is moved to the appropriate layer, or a new layer can be created in case the device is credentialed by a new ID authority component.

Identification of devices as disclosed in the subject specification (see FIG. 1) in combination with credential based topology (FIG. 5) discussed above, can facilitate simulation of an industrial control system and performance of devices/processes that operate in said system. In particular, topology and identification credentials of devices are necessary when conducting organizational modeling. In such a scenario, ID token 185 becomes an abstraction of the device, which is represented as a node linked to other nodes representing disparate devices (FIG. 5), and facilitates introduction of the device in a model, e.g., as a process variable. Within the framework of credential based topology (FIG. 5), which is a location agnostic rendition of the devices in an industrial control system, ID tokens (e.g., 185, and $185_1$-$185_M$) can be exploited to generate code objects for object-oriented languages for organizational modeling. Examples of such languages are organizational design modeling language (ODML), strictly declarative modeling language (SDML), etc. In an aspect, organizational simulation can be aimed at optimizing aspects of a process such as time to delivery of a manufactured good, device interaction to increase packaging throughput, link landscaping to reduce operational load on one or more controllers in an industrial control system and evaluate the controller's performance, and the like.

Figure 6:
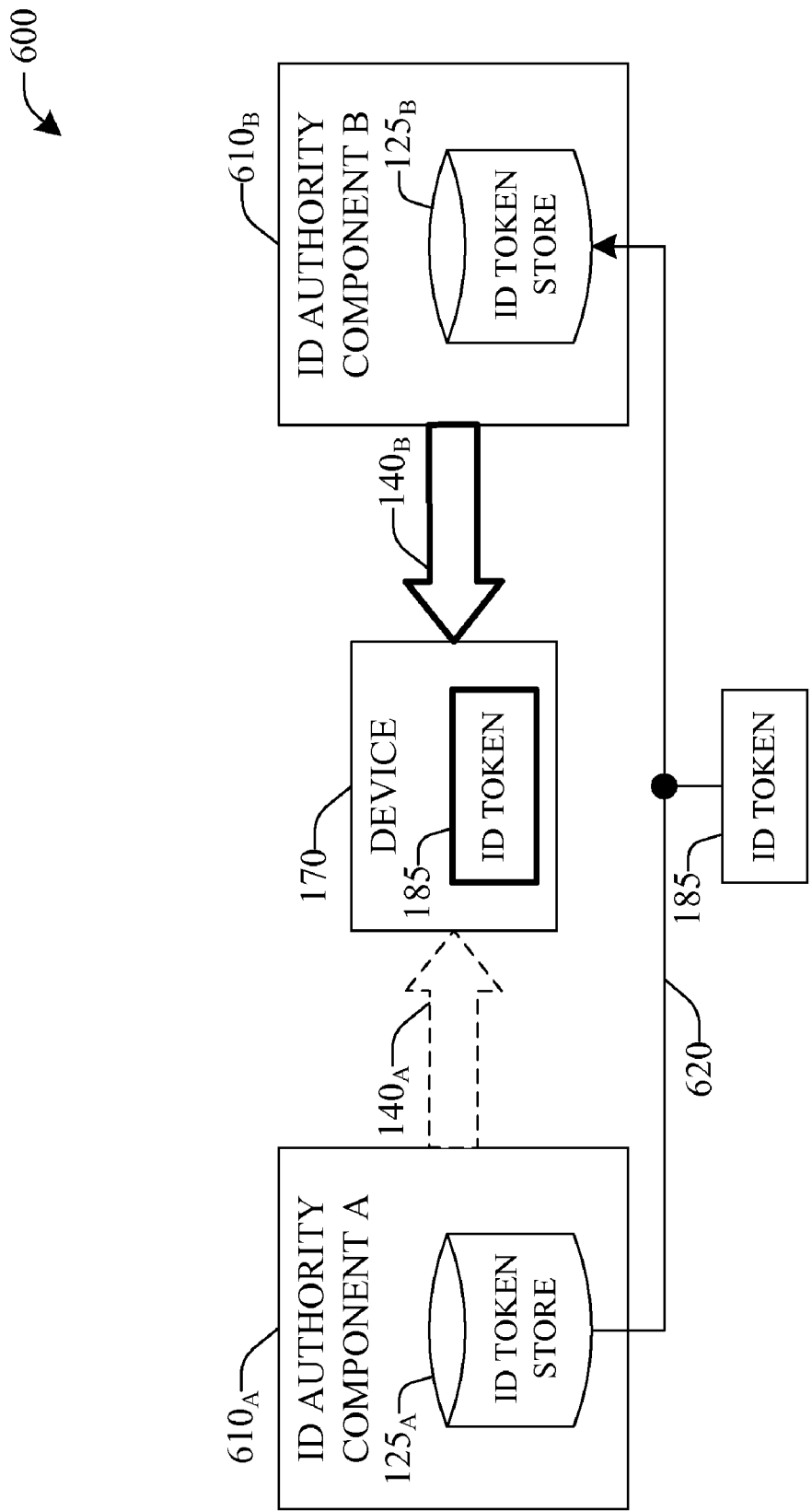
FIG. 6 illustrates a diagram of a handover of an ID token associated with a device from an ID authority component to a disparate ID authority component.

FIG. 6 illustrates in a diagram 600 a handover 620 of an ID token 185 associated with a device 170 from ID authority component $610_A$ to a disparate ID authority component $110_B$. Generally, through handover, a first identity authority (e.g., ID authority component $110_A$) transfers identification credentials of a device (e.g., device 170) to a second ID authority (such as ID authority component $110_B$). Handover 620 of ID token 185 corresponds to packet transfer or packet routing. As with acquisition described above, handover 620 can take place through a network connecting the disparate ID authorities. Local area networks, wide area networks, and their wireless counterparts, are suitable links for the transfer. Depending on the location of the ID authorities one or more types of networks can be utilized. As an example, in DSC a device in a plant can handover an ID token 185 corresponding to a reporting component of a device 170, to an ID authority located over the original equipment manufacturer (OEM) facility in a disparate geographical location. Such handover can be a temporary or permanent handover for diagnostic or maintenance purposes. In SCADA systems, handover 620 can occur wirelessly among relay substations.

It should be appreciated that in addition to transfer 620, complete handover entails updating the ID authority component identifier as well as the location credential (209 and 211, FIG. 2). Such process is completed by the receiving ID authority component ($610_B$, FIG. 6), and the updated ID token component 185 is transferred to device 170 over forward link $140_B$. (It is noted that the updating process and updated ID token is indicated in FIG. 5 with thick lines for FL $140_B$ and ID token 185.) After complete handover, possibly acknowledged with an ACK message from the receiving ID authority (e.g., $610_B$) sent over a reverse link (not shown), identification credentials in the originating ID authorization component (e.g., $110_A$) are removed from the ID token store (such as $135_A$) associated with the ID transferring authority.

Figure 7:
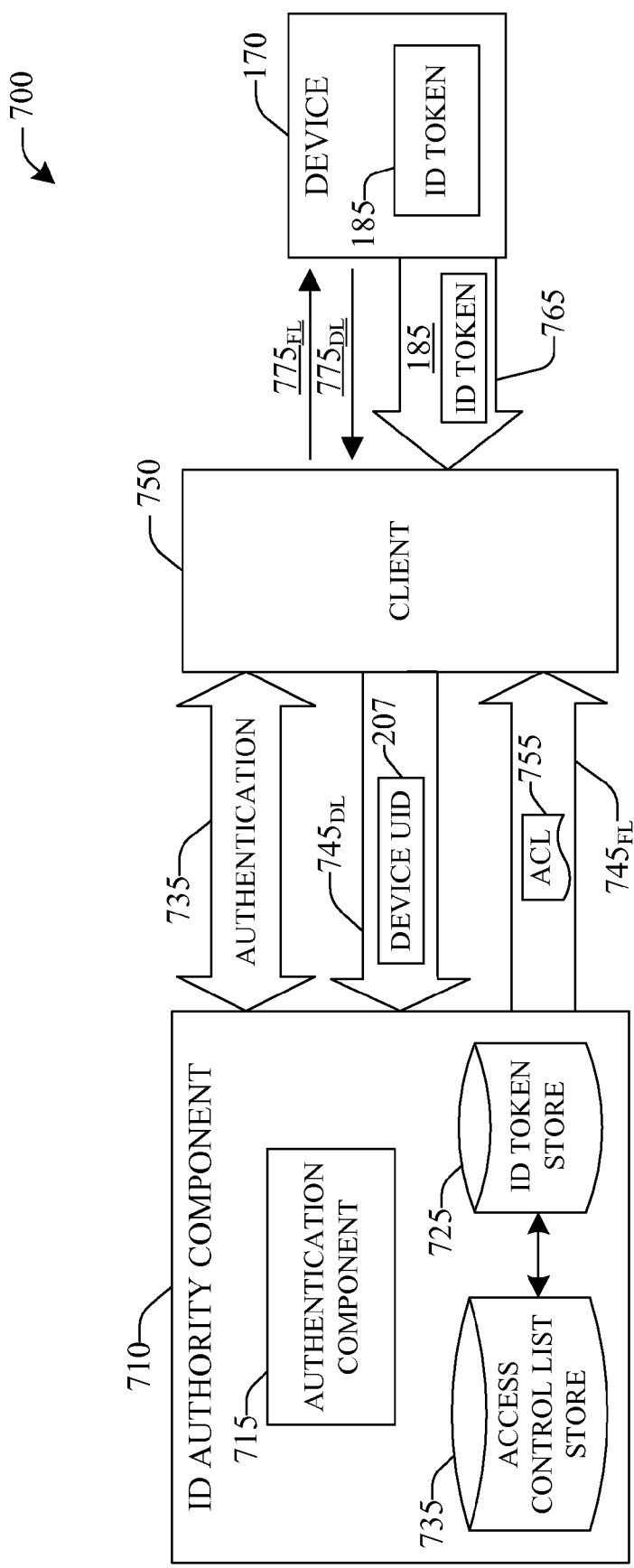
FIG. 7 illustrates an example system in which a client securely accesses a device in an industrial control system by relying on an ID authority component.

FIG. 7 illustrates an example system 700 in which a client 750 accesses securely a device 170 by relying on an ID authority component 710. Client 750 first communicates with a device 170 and obtains its ID token 185. Client 750 extracts the ID authority component identifier 209 and, optionally, the ID authority component location 211, from the device's ID authority component 710. The client 750 uses the ID authority component identifier 209 to determine if it already has an authenticated connection to the correct ID authority component 710. If not, the client uses the ID authority component location 211 to locate the ID authority component 710 and performs authentication step 735, conducted by authentication component 715. It should be appreciated that computational capability and security awareness of ID authority component 710 make it amenable to exploiting numerous typical procedures for network-based client authentication—e.g., password authentication, encryption keys exchange, certificate validation, and so forth. It should also be noted that when an indicator for ID authority component location 211 is not supported, various registration and/or directory-based lookup techniques can be used alternatively to locate ID authority component 710. As part of authentication 735, client 750 receives the actual ID authority component identifier 209 (not shown), which can be used to confirm that it has connected to the valid ID authority component 710. Upon confirmation, client 750 communicates to the ID authority component 710 providing it ($745_{DL}$) with the device unique identifier 207 from the device's ID authority component 710, and receives ($745_{FL}$) an access control list 755 associated with device 170. It is noted that the device unique identifier 207 has previously been assigned to device 170 by ID authority component 710, and stored in an ID token store 725. Further, access control list 755 has been associated with device 170 and stored in an access control list (ACL) store 735. The ACL contains information of specific features/capabilities that client 750 can exploit in device 170. It should be appreciated that operational credentials other than an ACL can be conveyed to the client in order for the client to access and operate the device. Client 750 enforces that only allowed accesses are made to device 170 and both communicate through client-device forward link $775_{FL}$ and device-client reverse link $775_{RL}$. It should be appreciated that in the access mechanism described above the ID token is a passive security agent with respect to the ID token. Such characteristic affords a light-weight payload protection to devices that lack computational resources for active mitigation of fraudulent access attempts.

The secure nature of the access of client 750 to device 170 stems from the authentication 735 of client 750 by ID authority component 710; the client's verification of the actual ID authority component identifier 209 returned as part of the authentication process; and the clients adherence to the device's ACL 755. The security afforded by embodiment 700 can mitigate fraudulent access and control of a device via a spoof ID authority. It should be appreciated that for critical devices in a control system, verification of identification credentials (e.g., an ID token component) can include verifying biometrics embedded in an ID token component. Such verification is an added layer of security afforded to critical devices, and involves a physical validation of biometric credentials of an operator responsible for client 750. It should be appreciated that biometric security features can be imparted to ID token 185 by registering an operator with a device at the time an ID authority component (e.g., 110, $110_A$, $110_B$, or 710) issues identification credentials and assigns an identification token to the device.

Identification token component 185 can also afford, via authenticated access as described above, secure access and manipulation of an off-device (e.g., a file system) configuration image associated with the device. In an aspect, a client seeking to modify contents of a device by uploading the device's contents into a configuration image of the device, altering the device's configuration in said image, and subsequently downloading such modified contents into the device, can be required to authenticate its legitimacy with an ID authority that has issued identification credentials to the device that is to be modified, and to authenticate an ID token associated with the device. Successful authentication can then allow the client to manipulate the configuration image of the device. It should be appreciated that the configuration image is a logical entity, yet it protected by an ID token issued to the physical device associated with it.

In view of the example systems shown and described above, methodologies that may be implemented in accordance with the disclosed subject matter, will be better appreciated with reference to the flowcharts of FIGS. 8A and 8B, 9, and 10. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g., device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 8:
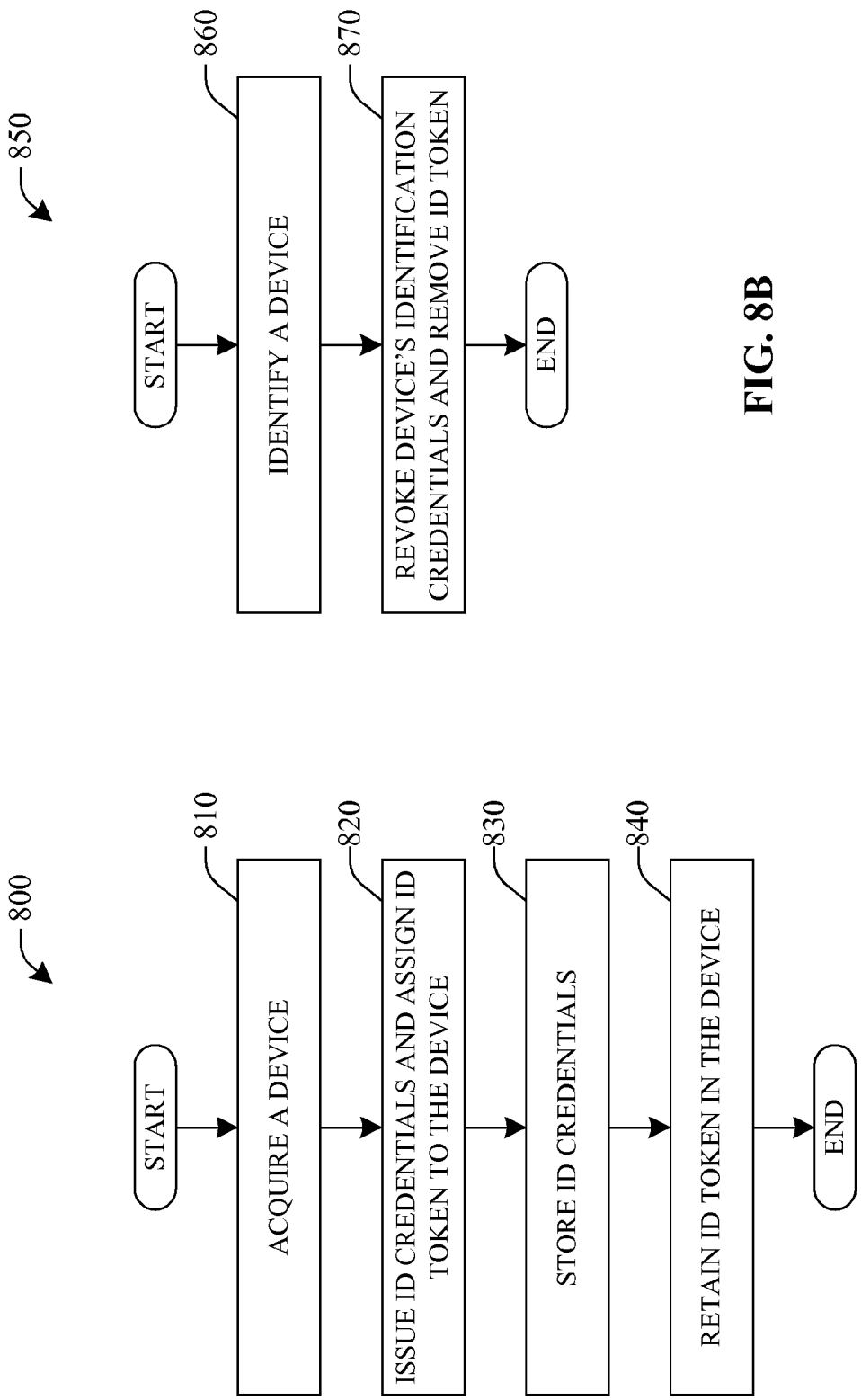
FIGS. 8A and 8B present, respectively, a flowchart of a method for commissioning and decommissioning a device in an industrial control system.

FIG. 8A illustrates a flowchart of a method 800 for commissioning a device in an industrial control system. At act 810 a device is acquired. Acquisition of the device includes characterizing operational and functional properties of the device—e.g., whether the device is a sensor or an actuator, or both; as well as reporting capabilities of the device, such as generating alarms, transferring/displaying data. In an aspect, acquisition is initiated by an identification authority component (e.g., 110; FIG. 1), through an acquisition component (e.g., 115; FIG. 1) which periodically broadcasts an acquisition signal to the network of devices in the industrial control system. In another aspect, acquisition is initiated at the time the device is installed in the industrial control system by a configuration component (e.g., configuration component 175) in the device that is acquired. At 820 identification credentials are issued to the device and an ID token is assigned to the device, the identification token contains the issued identification credentials including a unique identifier for the device and a unique identifier for the identification authority entity. In an aspect, an identification authorization component within the industrial control system issues the identification credentials. At act 830, the issued identification credentials are stored; for instance, ID credentials are stored in the issuing identification authority component. The ID token is retained in the device at act 840.

FIG. 8B displays a flowchart of a method 850 for decommissioning a device in an industrial automation control system. A device to be decommissioned is identified in act 860. In an aspect, identification consists of retrieving the device's identification credentials extant in an ID authority component (FIG. 1) that issued the ID credentials. The issuing authority can reside in a controller or a specific device in the industrial control system, or in a local or remote network server. At act 870, identification credentials of the identified device are revoked—e.g., unique identifiers for the device are invalidated or reset to factory values prior to an acquisition/commissioning event in the industrial control system—and a token assigned to the device is removed from the device. In an aspect, revocation of identification credentials can consist of removing the credentials stored in an ID authority component. In another aspect, a client application (e.g., client 750) that has gained access to the device that is to be decommissioned can enforce that only allowed access to the device takes place; thus, decommissioning attempts from a user without decommissioning privileges are prevented.

Figure 9:
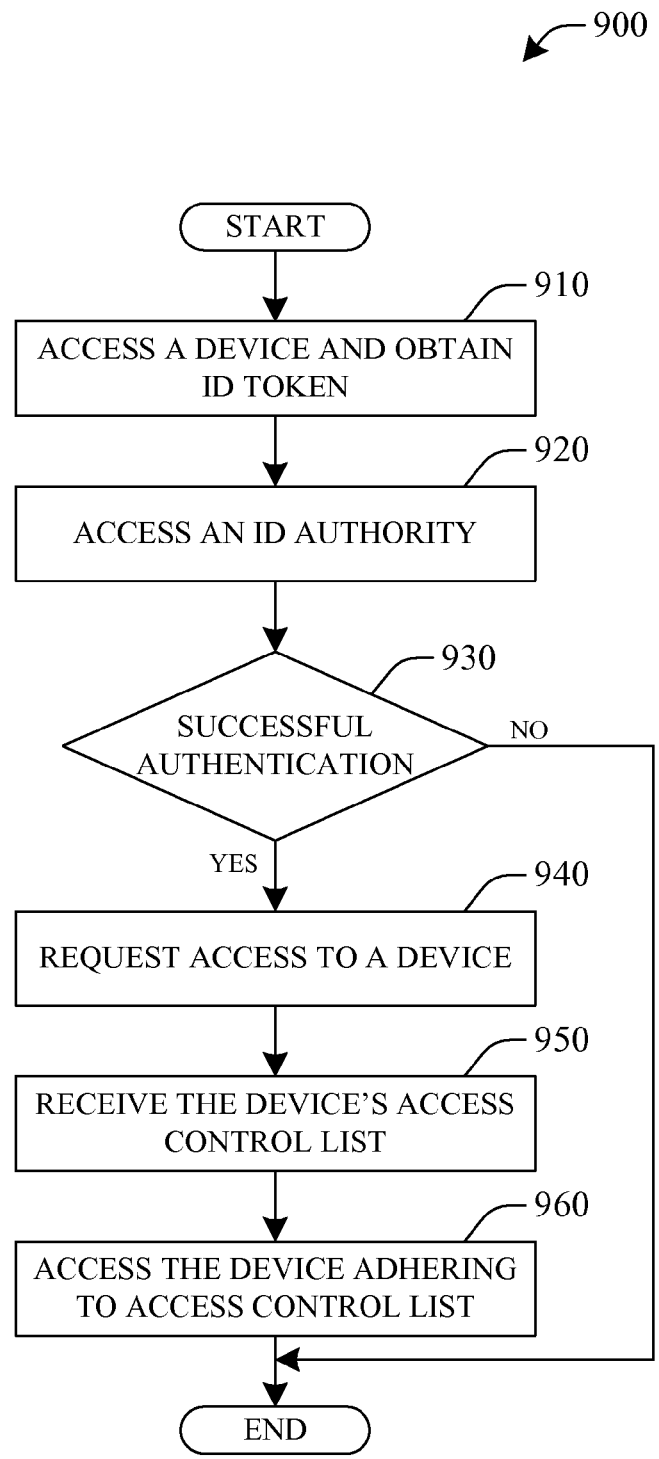
FIG. 9 presents a flowchart of a method for securely accessing a device in an industrial control system.

FIG. 9 presents a flowchart of a method 900 for accessing a device in an industrial control system. At act 910, a device is accessed and an identification token is retrieved. As discussed in connection with FIG. 1, the retrieved ID token contains identification credentials for the device and for an identification authority that issued the token. At act 920 the identification authority that issued said identification credentials is accessed. It is noted that access to the identification authority typically is preceded by an attempt to access it; with only successful attempts accessing the ID authority. As discussed above in connection with FIG. 1, such an ID authority generally issues identification credentials and assigns ID tokens, which contain the credentials, for a plurality of devices in the industrial control system. In addition, ID authority stores the issued credentials and conveys the ID tokens to the plurality of credentialed devices. Act 930 is a validation act wherein the authenticity and legitimacy of the access to the ID authority is checked. In an aspect, when a computer-implemented application accesses the ID authority, authentication typically is one of various methods to authenticate access from a computer-implemented client, such as password validation, certificate validation, encryption keys exchange, etc. Legitimate, authentic access results in requesting access to a device at act 940. In an aspect, the request is effected by conveying the device unique identifier retrieved from an ID token. In act 950, an access control list is received. As discussed above, the access control list constitutes an operational credential for the device, and defines the scope of operability of the device. At act 960 the device is accessed, adhering to the scope defined by a received ACL. Validation acts in method 900 provide security layers for accessing a device that can mitigate spoofing (of an ID authority) attacks on a device.

Figure 10:
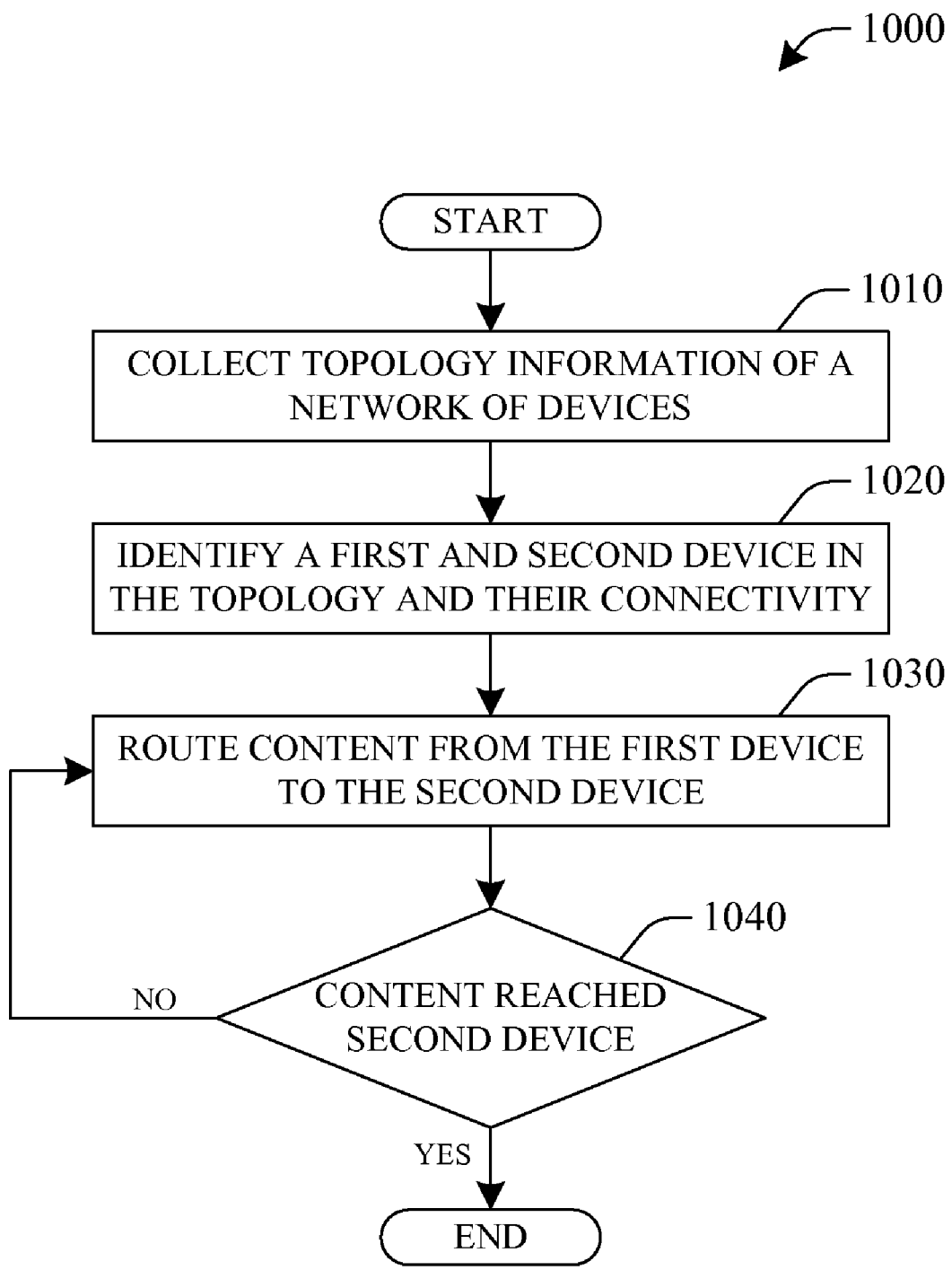
FIG. 10 displays a flowchart of a method for routing information in an industrial control system.

FIG. 10 displays a flowchart of a method 1000 for routing information in an industrial control system. The information can encompass instructions, data transmissions, data requests, acknowledge (ACK)/non-acknowledge(NACK) messages, control bits, e.g., acquisition indication, device fault, etc. At act 1010 topology information of a network of devices (see FIG. 5, as an example) in the industrial control system is collected. Such information can be gathered, for instance, by accessing the ID authorities that have issued identification credentials for the networked devices (as discussed in connection with FIGS. 1 and 2, the ID credentials uniquely identify the devices within the scope of an ID authority, and said credentials indicate the location of the issuing ID authority), or by retrieving location information from the ID token that resides in each device that is part of the network. At act 1020, a first device and a second device are identified, e.g., ID credentials retrieved from issuing ID authority, and their connectivity determined based on the gathered topology information. In an aspect, determining the device connectivity can incorporate a device's fault status, e.g., downtime for maintenance, inactive due to an issued alarm, or corrupted ID token. The latter can occur when any of the identifiers in an ID token (FIG. 2) that resides in the device are invalid or absent. At act 1030, content or information is routed from the first device to the second device. In an aspect, such routing exploits the connectivity of the networked devices to determine the routing path among devices present in between the first device and the second device. A reception integrity check, or acknowledgement check, is conducted at act 1040. The integrity check can be based on the unique device identifier present in an ID token: The transmitted content transmission can include the unique device identifier of the recipient device; such identifier is validated upon receiving the information, and in case the validation check is successful an ACK message, or other control information, can be sent to the originating device.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

As used hereinbefore, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in the subject disclosure and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of installing an industrial automation device in an industrial automation network, comprising:
    communicating industrial automation device information across an industrial automation network to an identification authority component, the industrial automation device information including a type of industrial automation device being installed and at least one functionality of the industrial automation device being installed, wherein the functionality of the industrial automation device is at least one of a role or a level of criticality of the industrial automation device in an industrial automation process;
    issuing an industrial automation device identification credential based at least in part on the industrial automation device information communicated across the industrial automation network, the industrial automation device identification credential including a device identifier to uniquely identify the industrial automation device and an identification authority component identifier to uniquely identify an identification authority component that issues the industrial automation device identification credential; and
    establishing communication with the industrial automation device across the industrial automation network and receiving operational credentials including an access control list associated with the industrial automation device from the identification authority component in response to authenticating the industrial automation device identification credential.

2. The method of claim 1, wherein the communicating industrial automation device information includes storing the industrial automation device information in an access control list associated with an identification authority component.

3. The method of claim 1, wherein the communicating industrial automation device information includes communicating industrial automation device information across the industrial automation network in response to a periodic broadcast message from an identification authority component.

4. The method of claim 1, further including storing the industrial automation device identification credentials in an identity token component adapted to reside in the industrial automation device.

5. The method of claim 1, wherein the communicating with the industrial automation device includes obtaining the industrial automation device identification credential from the industrial automation device, and receiving the operational credentials from an identification authority component based on the industrial automation device identification credentials obtained from the industrial automation device.

6. The method of claim 1, wherein the functionality of the industrial automation device further includes a reporting capability of the industrial automation device.

7. A non-transitory computer-readable medium having instructions stored thereon that, in response to execution, cause at least one device to perform operations comprising:
    communicating industrial automation device information across an industrial automation network to an identification authority component, the industrial automation device information including a type of industrial automation device being installed and at least one functionality of the industrial automation device being installed, wherein the functionality of the industrial automation device is at least one of a role or a level of criticality of the industrial automation device in an industrial automation process;

issuing an industrial automation device identification credential based at least in part on the industrial automation device information communicated across the industrial automation network, the industrial automation device identification credential including a device identifier to uniquely identify the industrial automation device and an identification authority component identifier to uniquely identify an identification authority component that issues the industrial automation device identification credential; and establishing communication with the industrial automation device across the industrial automation network and receiving operational credentials including an access control list associated with the industrial automation device from the identification authority component in response to authenticating the industrial automation device identification credential.

8. The non-transitory computer-readable medium of claim 7, further including storing the industrial automation device identification credentials in an identity token component adapted to reside in the industrial automation device.

9. The non-transitory computer-readable medium of claim 7, wherein the communicating with the industrial automation device includes obtaining the industrial automation device identification credential from the industrial automation device, and receiving the operational credentials from an identification authority component based on the industrial automation device identification credentials obtained from the industrial automation device.

10. The non-transitory computer-readable medium of claim 7, wherein the functionality of the industrial automation device further includes a reporting capability of the industrial automation device.

11. A system for installing an industrial automation device in an industrial automation network, comprising:

an identification authority component configured to:
  receive industrial automation device information across an industrial automation network, the industrial automation device information including a type of industrial automation device being installed and at least one functionality of the industrial automation device being installed, wherein the functionality of the industrial automation device is at least one of a role or a level of criticality of the industrial automation device in an industrial automation process;
  issue an industrial automation device identification credential based at least in part on the industrial automation device information communicated across the industrial automation network, the industrial automation device identification credential including a device identifier to uniquely identify the industrial automation device and an identification authority component identifier to uniquely identify the identification authority component;
  authenticate communication between a component and the industrial automation device across the industrial automation network based on the industrial automation device identification credential; and
  transmit operational credentials to the industrial automation device.

12. The system of claim 11, wherein the functionality of the industrial automation device further includes a reporting capability of the industrial automation device.

13. A system for installing an industrial automation device in an industrial automation network, comprising:

means for communicating industrial automation device information across an industrial automation network to an identification authority component, the industrial automation device information including a type of industrial automation device being installed and at least one functionality of the industrial automation device being installed, wherein the functionality of the industrial automation device is at least one of a role or a level of criticality of the industrial automation device in an industrial automation process;

means for issuing an industrial automation device identification credential based at least in part on the industrial automation device information communicated across the industrial automation network, the industrial automation device identification credential including a device identifier to uniquely identify the industrial automation device and an identification authority component identifier to uniquely identify an identification authority component that issues the industrial automation device identification credential; and means for establishing communication with the industrial automation device across the industrial automation network and receiving operational credentials including an access control list associated with the industrial automation device from the identification authority component in response to authenticating the industrial automation device identification credential.

14. A system for installing an industrial automation device in an industrial automation network, comprising:

the industrial automation device configured to:
  transmit industrial automation device information across an industrial automation network to an identification authority component, the industrial automation device information including a type of industrial automation device being installed and at least one functionality of the industrial automation device being installed, wherein the functionality of the industrial automation device is at least one of a role or a level of criticality of the industrial automation device in an industrial automation process;
  receive from the identification authority component an industrial automation device identification credential based at least in part on the industrial automation device information communicated across the industrial automation network, the industrial automation device identification credential including a device identifier to uniquely identify the industrial automation device and an identification authority component identifier to uniquely identify the identification authority component; and
  establish communication with a component across the industrial automation network and receiving operational credentials including an access control list associated with the industrial automation device from the identification authority component based on the industrial automation device identification credential.

* * * * *